D. R. HOLDEN.
FERTILIZER DISTRIBUTER.
APPLICATION FILED NOV. 7, 1919.
Reissued Feb. 10, 1920.
14,804.
2 SHEETS—SHEET 1.
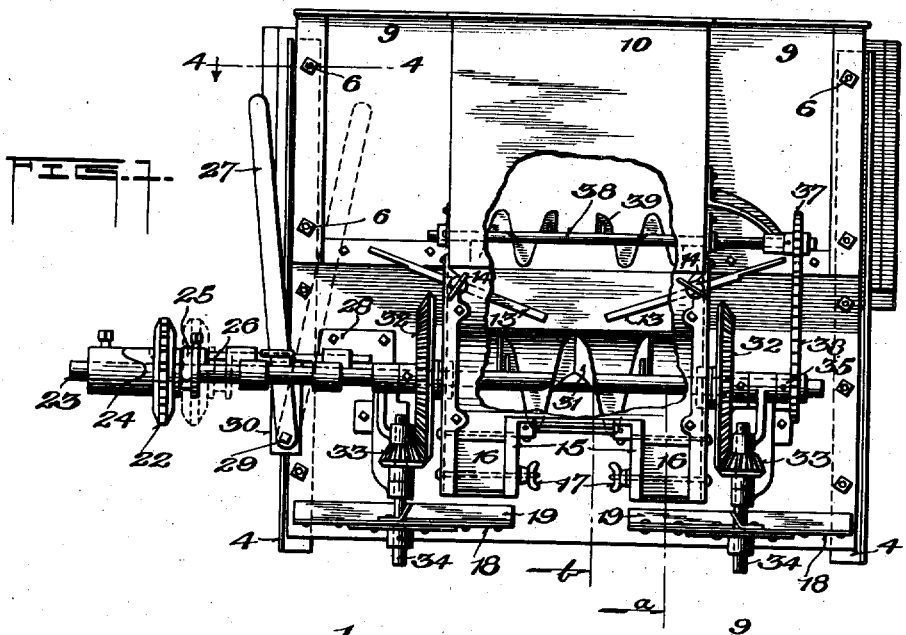
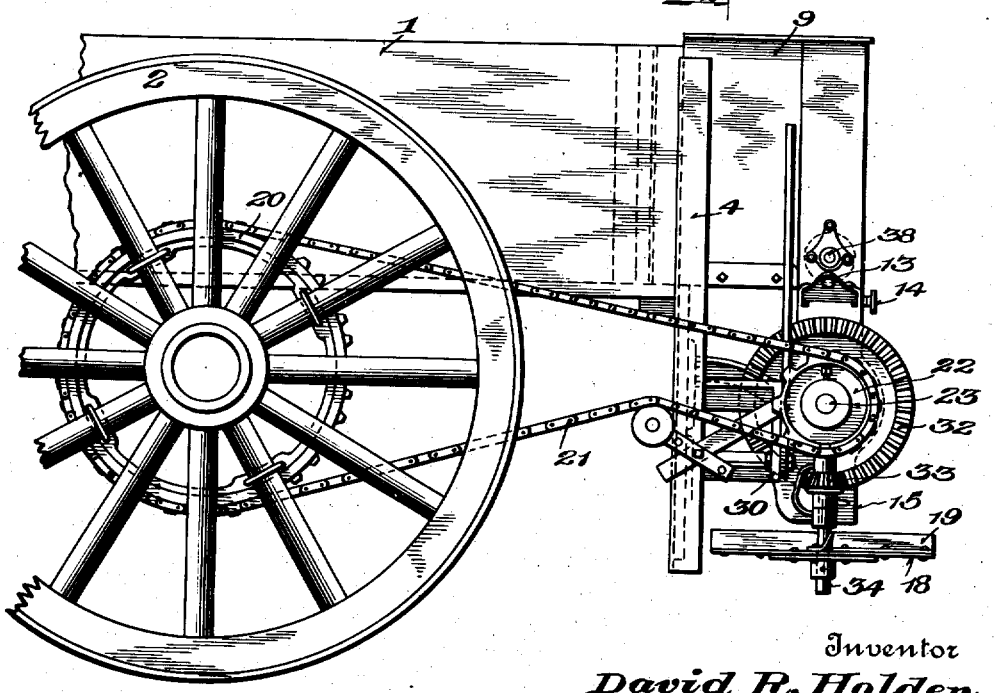
FIG. 2.
Inventor
David R. Holden,
By Chas. H. La Porte
Attorney

D. R. HOLDEN.

FERTILIZER DISTRIBUTER.

APPLICATION FILED NOV. 7, 1919.

Reissued Feb. 10, 1920.

14,804.

2 SHEETS—SHEET 2.

Inventor

David R. Holden,

By Chas. N. La Porte

Attorney

UNITED STATES PATENT OFFICE.

DAVID R. HOLDEN, OF PEORIA, ILLINOIS.

FERTILIZER-DISTRIBUTER.

14,804. Specification of Reissued Letters Patent. Reissued Feb. 10, 1920.

Original No. 1,285,183, dated November 19, 1918, Serial No. 160,107, filed April 6, 1917. Application for reissue filed November 7, 1919. Serial No. 336,517.

*To all whom it may concern:*

Be it known that I, DAVID R. HOLDEN, a citizen of the United States, residing at Peoria, in the county of Peoria and State of Illinois, have invented certain new and useful Improvements in Fertilizer-Distributers, of which the following is a specification.

My invention relates to improvements in fertilizer distributers, and one of the objects is the provision of such a device which may be readily attached to the rear of a wagon, which is low down, and therefore easy on the operator, having the bottom approximately flush with the floor of the wagon, and having means for positively distributing or scattering the material over a wide area, located close to the ground so as to obtain most efficient results.

The primary object of the invention is to provide a distributer or scattering mechanism which is formed so as to take the place of the usual end gate of the wagon box and forms a continuation of the wagon box and which is further secured in place by use of the customary end gate cleats borne by the wagon box.

Further, the invention aims to provide a distributer or scattering mechanism which has a completely free and unobstructed inlet that opens inwardly toward the wagon box in substantially the plane of the latter so that the operator is not required to lift up the material in shoveling the latter into the inlet, and cannot strike his shovel against any of the operating or movable parts of the distributer or scattering mechanism.

Another object of this invention is the provision in such a mechanism, of a frame work adapted to be supported on the rear end of a wagon, with the receiving surface approximately flush with the floor of the wagon, having a hopper with suitably controlled openings leading to broadcast distributing or scattering means or parts, all being operated from the wheel of the wagon.

The invention has for a further object to provide a double distributing or scattering mechanism of the fan type, especially adapted for distributing or scattering fertilizer materials, and wherein the driving bevel gear wheels which actuate the bevel pinions on the distributer shafts, are disposed adjacent the discharge spouts, instead of having the bevel pinions disposed next the spouts, which heretofore has been the case; whereby the spouts may depend vertically from the hopper in parallel relation to each other, instead of inclined, in which position they would diverge from the hopper to the fans, and in which latter construction the tendency for the material to pack and clog, especially if wet, is very great. This packing of the material and clogging of the spouts, when the spouts are vertically disposed is entirely obviated.

Further objects include improvements in details of construction and arrangement, whereby an efficiently operating mechanism is provided.

In the drawings,

Figure 1 represents a rear elevation of a mechanism constructed according to my invention, mounted on the rear end of a wagon box, parts being broken away to facilitate the disclosure;

Fig. 2 is a side elevation of the rear part of a wagon, with a mechanism constructed according to my invention mounted thereon;

Figure 3:
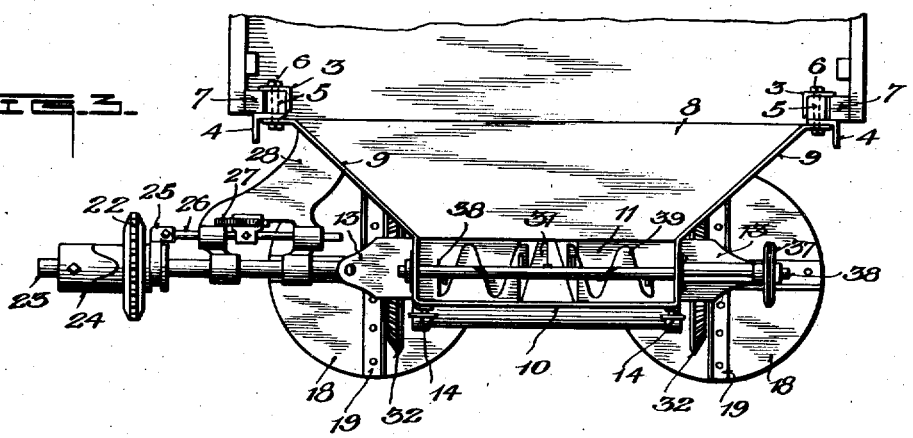
Fig. 3 is a top plan view of the mechanism shown in Fig. 1.
Figure 4:
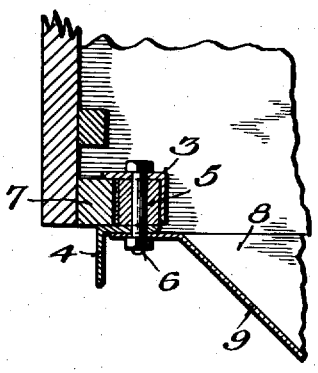
Fig. 4 is a detail sectional view on line 4—4 of Fig. 1, shown on an enlarged scale to illustrate the manner of mounting the attachment on a wagon.
Figure 5:
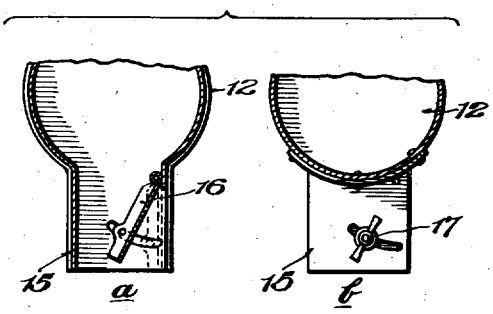
Fig. 5 is a vertical section on line *a* and on *b*, respectively, of Fig. 1.
Figure 6:
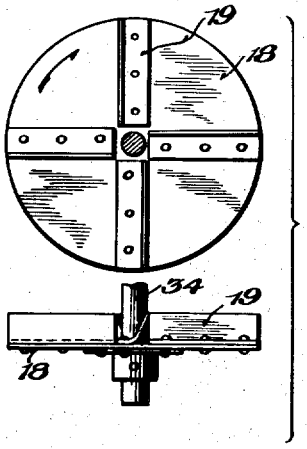
Fig. 6 is a top view and side elevation, respectively, of one of the distributing members.

My invention is preferably designed to be made in the form of an attachment to be applied to the rear ends of wagon boxes.

Referring to the drawings, the numeral 1 designates the body of the wagon having the usual wheels, one of which 2, is shown. The frame work of the mechanism includes the vertically arranged angle members 3 and the additional angle members 4, having mounted therebetween the spacing bar members 5, the securing bolts 6 passing therethrough. These angle members 3 and 4 are spaced apart and so arranged as to embrace the end cleat 7 of the wagon body, so that in mounting the mechanism in position, it is only necessary to lift it high enough so that the spaced angle members 3 and 4 can pass over the upper end of the end cleat 7. It will then drop by gravity to its proper position and will be securely held and supported there.

It is also to be noted that the flared open side of the member having bottom 8, and sides 9, forms an inlet into the member, and that such inlet is completely free and unobstructed, being devoid of any operating or movable parts within its interior. Thus, in shoveling material into the inlet of the member, the shoveling can be easily and quickly effected and without danger of striking any of the operating parts with the shovel, or of throwing the material into, against or entangling the same in or on such parts. The angle iron members 4 extend a considerable distance below the floor of the wagon so as to support the operating parts of the mechanism, as will presently be described.

The body of the device includes the bottom member 8 which is arranged so as to be approximately flush with the floor of the wagon box when the device is in position. The body member also has the side portions 9 which are attached to the angle iron supporting members and also the end portion 10, this being reduced somewhat, due to the converging of the side members 9. The bottom member 8 does not extend entirely to the end member 10, leaving the elongated opening 11, which forms the discharge passage for the material into the hopper or receptacle 12, which is positioned therebelow. Cut-off plate members 13 are positioned so as to be adjusted to vary the opening into said hopper or receptacle, being held in proper position by means of the set-screws or thumb-nuts 14.

This hopper or receptacle 12 is provided with the spaced vertically depending spouts 15 in each end. These spouts have the swinging valve 16 adjustable by means of the bolt and nut connection 17 as shown, and are positioned so as to discharge the material on the broadcast distributing or scattering means, which take the form of the circular fans 18. These fans have the vanes 19 mounted thereon, which are provided with the securing portion and the upwardly extending throwing portions, the vanes being curved instead of angle formation, so as to prevent sticking of the material thereto. Providing vertical spouts, instead of inclining the same, so that they diverge from the hopper to the fans, as has been customary, disposes of the chance of the fertilizer material packing and clogging the spouts, especially when the material is damp.

This mechanism is adapted to be operated from the wheel of the vehicle which has mounted thereon, the sprocket 20 from which chain 21 runs to the sprocket 22 loosely, and slidably mounted on the driving shaft 23, this driving shaft extending across the mechanism. The hub of the sprocket 22 is constructed so as to form part of a clutch 24 and the sprocket is moved by means of the yoke 25 on the rod 26 and the movable lever 27 connected thereto, the rod 26 being slidable in the bracket 28 and the lever 27 having the pivotal connection 29 from below, with the arm or bracket 30 depending therefrom.

The shaft 23 extends through the hopper or receptacle and is provided therein with the conveyer vanes 31 which are oppositely arranged so as to convey material from the middle of the mechanism to the spouts. Positioned on the outside of the hopper or receptacle are the driving bevel gears 32 in mesh with the bevel pinions 33 on the upright shafts 34 to which distributing or scattering fans 18 are attached. These parts are geared so that the fans will be rotated oppositely to each other so as to throw the material outwardly over as large an area as possible. Special attention is directed to the position of the bevel gears 32 and the bevel pinions 33, with respect to the spouts 15. Positioning the spouts so that they depend vertically from opposite ends of the hopper permits the placing of the bevel gears 32 next the hopper and spouts, thus the fans may be rotated oppositely to each other so as to throw the material outwardly from the center of the machine. This arrangement also makes it possible to have the spouts depend vertically from the hopper, instead of being inclined, and places their power or discharging ends over the fans in alinement with each other and approximately in axial alinement with said fans. I find this plan of distribution is far better and more efficient than where the spouts diverge to the fans, and where the fans need to carry the material farther to the point of discharge.

On the end of shaft 23, I mount the sprocket 35 from which chain 36 extends to sprocket 37 on the agitator shaft 38, which passes through the body of the mechanism above the opening 11, being provided with the vanes or other suitably agitating means 39, so as to prevent the material from caking about the opening 11. It is to be noted that I have provided a mechanism which can be readily attached to existing forms of wagons fitting tightly over the end cleats and being of light construction, so that its mounting may be readily accomplished. The bottom 8 is preferably supported approximately flush with the floor of the wagon so that the material may be easily shoveled into the discharge passage, where it is operated on by the agitating means, and discharged into the hopper or receptacle, the rate of discharge being controlled by the position of the cut-off plate members 13. The conveyer 31 feeds the material to the discharge spouts and the passage of the material through these spouts is controlled by the valve member 16. The distributing or scattering fans throw or spread the material over a large area and are located comparatively close to the ground, so that none of the material is wasted by blowing away. The mechanism is so arranged that material composed of particles of comparatively large size may readily pass through the same and provision is made for the use of wet or damp material just as well as for dry material.

What I claim is:

1. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of material scattering means located below the hopper, said hopper having spouts adapted to direct material to the scattering means, and means for rotating said scattering means.

2. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of material scattering means located below the hopper said hopper having spouts adapted to direct material to the scattering means, means for rotating said scattering means, and means for controlling the passage of material from said body into said hopper.

3. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of material scattering means located below the hopper, said hopper having spouts adapted to direct material to the scattering means, means for rotating said scattering means, and agitating means in said body above said opening.

4. A mechanism of the character described, adapted to be attached to the rear end of a wagon including a frame, a body having a bottom adapted to be positioned flush with the floor of the wagon, a receptacle located therebelow, said bottom having an opening leading to said receptacle, a plurality of material scattering means located below the hopper, said hopper having spouts adapted to direct material to the scattering means, means for rotating said scattering means, and conveying means in said hopper to deliver the material to said spouts.

5. A mechanism of the character described adapted to be attached to the rear end of a wagon including a frame, a body having a bottom adapted to be positioned flush with the floor of the wagon, a receptacle located therebelow, said bottom having an opening leading to said receptacle, a plurality of material scattering means located below the hopper, said hopper having spouts adapted to direct material to the scattering means, means for rotating said scattering means, and means for regulating the amount of material discharged through said spouts.

6. A mechanism of the character described, adapted to be mounted on the rear end of a wagon, including a frame, a body having a bottom adapted to be positioned flush with the floor of the wagon, a hopper located below the bottom, the bottom having an opening leading to said hopper, a plurality of material scattering means located below said hopper, said hopper having spouts leading to said scattering means, an operating shaft passing through said hopper and having gears for operating said scattering means, and a conveyer mounted on said shaft within the hopper for feeding the material to the spouts.

7. A mechanism of the character described, adapted to be mounted on the rear end of a wagon, including a frame, a body having a bottom adapted to be positioned flush with the floor of the wagon, a hopper located below the bottom, the bottom having an opening leading to said hopper, a plurality of material scattering means located below said hopper, said hopper having spouts leading to said scattering means, an operating shaft passing through said hopper and having gears for operating said scattering means, a conveyer mounted on said shaft within the hopper for feeding the material to the spouts, an agitator mounted in the body above the opening, and connections between said shaft and said agitator for driving the same.

8. A mechanism of the character described adapted to be mounted on the rear end of a wagon, including a frame, a body having a bottom adapted to be positioned flush with the floor of the wagon, a hopper located below the bottom, the bottom having an opening leading to said hopper, a plurality of material scattering means located below said hopper, said hopper having spouts leading to said scattering means, an operating shaft passing through said hopper and having gears for operating said scattering means, a conveyer mounted on said shaft within the hopper for feeding the material to the spouts, said shaft having clutch connections adapted to be operated by means from the wagon wheel.

9. A mechanism of the character described, including in combination, a frame and a body, material scattering means located beneath the body and comparatively close to the ground, means for conveying material from said body to said scattering means, means for actuating the scattering means, said frame having portions spaced apart so as to embrace the end cleats of a wagon body for detachably mounting the whole mechanism on the rear end of a wagon.

10. In a mechanism of the character described, including in combination, a frame having a body mounted thereon, said frame having portions spaced apart so as to embrace the end cleats of a wagon body, material scattering means located beneath the body and comparatively close to the ground, means for conveying material from said body to said scattering means, means for actuating the scattering means, said body having a bottom adapted to be positioned flush with the floor of a wagon.

11. In a mechanism of the character described, including in combination, a frame having a body mounted thereon, said frame including a plurality of angle members spaced apart so as to receive the end cleats of a wagon body, material scattering means located beneath the body and comparatively close to the ground, means for conveying material from said body to said scattering means, means for actuating the distributing means, said body having a bottom adapted to be positioned flush with the floor of a wagon.

12. An apparatus of the character described, adapted to be mounted on the rear end of wagon, including spaced supporting frame parts adapted to embrace a cleat of the wagon body, a body having a bottom adapted to be positioned substantially flush with the floor of the wagon, a hopper, said bottom having an opening leading to said hopper, and material scattering means located below said hopper and means to operate said scattering means.

13. In a mechanism of the character described, including in combination, a frame having a body supported thereby, said frame having portions spaced apart so as to embrace the end cleats of a wagon body for detachably supporting the whole mechanism on the rear end of a wagon, material scattering means located beneath the body, means for conveying material from said body to said scattering means and means for actuating the scattering means.

14. A mechanism of the character described, including in combination, a frame and a body supported thereby, said frame including angle members arranged in pairs and spaced apart so as to embrace the end cleats of a wagon body, material scattering means, means for conveying material from said body to said scattering means, and means for actuating said scattering means.

15. A material scattering device for wagons to be substituted for the customary end gate and to be secured in place by the end gate cleats, including a member extending across tht rear end of a wagon and formed with an inlet that opens inwardly in confronting relation to and forms a continuation of the wagon body interior, means engaging the end gate cleats to prevent relative horizontal movement between the device and wagon box, and scattering means associated with the inlet.

16. A material scattering device for wagons to be substituted for the customary end gate including a member extending across the rear end of the wagon forming an inclosure therefor and having a material supporting surface, said member having an outlet, scattering means associated with the outlet, means located externally of the inclosure to actuate the scattering means, and means to removably attach the member to the rear end of the wagon body.

17. A material scattering device for wagons to be substituted for the customary end gate and to be secured in place by the end gate cleats, including a member fitted across the rear end of the wagon box and having a material supporting surface, lying approximately in the same plane with the floor thereof, said member being open on its inner side so as to communicate with the wagon box interior, means to attach the member to the end gate cleats, and scattering means associated with the member and in communication with said open side of the member.

18. A material scattering device for wagons, including a receiver having an inlet and forming a continuation of the box interior, scattering means communicating with the inlet and located below the plane thereof, operating means for the scattering means arranged entirely below the inlet so as to leave the latter completely free and unobstructed, said receiver formed so as to guide the material laterally to the scattering means.

19. A material scattering device for wagons for securement to the end gate cleats, including a member for extending across the rear end of the wagon box, scattering means carried by the member, means to actuate the scattering means, and means for slidably embracing the cleats to allow the member to be applied to and removed from the wagon box by vertical sliding of the member.

20. A material scattering device for wagons for securement to the end gate cleats, including a member for extending across the rear end of the wagon box, said member having a bottom forming a continuation of the wagon box floor and having an outlet, vertical elements for engagement with the outer sides of the cleats and extending below the bottom of the member, means to secure said elements to the cleats, and scattering mechanism associated with the outlet and carried by the lower portions of the vertical elements.

21. A material scattering device for securement to the end gate cleats of wagon boxes including a member formed to extend across the rear end of the wagon box, scattering mechanism carried by the member, and opposed parts borne by each of the ends of the member to receive the end gate cleats therebetween.

22. In a material scattering device, a member having an outlet, a hopper underlying the outlet, means to feed material cast into the member from opposite sides of the member to a central point in said outlet, said hopper having spaced outlets, means in the hopper to convey the material in opposite directions to the hopper outlets, and a central adjustable control underlying and into which the feeding means discharges the material.

23. In a material scattering device, a member having an outlet, a hopper underlying the outlet, means to feed material cast into the member from opposite sides of the member to a central point in said outlet, said hopper having spaced outlets, a spout communicating with each outlet, a valve in each spout, means in the hopper to convey the material in opposite directions to the hopper outlets, a central adjustable control underlying and into which the feeding means discharges the material, and a scattering device below each spout.

24. A mechanism of the character described, adapted to be attached to the rear end of a wagon, including a frame, a body having a bottom adapted to be positioned approximately flush with the floor of the wagon, a receptacle located therebelow, said bottom having an opening leading to said receptacle, a plurality of scattering fans located below the hopper, spouts depending vertically from opposite ends of said hopper and adapted to direct material to said fans, and means for rotating said fans so as to scatter material from the center of the machine outwardly.

25. In a material scattering device, the combination of a hopper, having discharge outlets at its opposite ends, a spout depending vertically from each hopper outlet and located within the vertical confines of the hopper sides, a driving shaft extending longitudinally of the hopper, a conveyer in the hopper operated by said shaft and arranged to feed material in opposite directions toward the hopper outlets, a bevel gear on said shaft next adjacent each spout, a scattering fan rotatable below each spout and arranged to receive material therefrom, a vertical shaft for each fan, and a bevel pinion on each vertical shaft meshing with a bevel gear on said driving shaft.

DAVID R. HOLDEN.